April 11, 1972 I. KALNS Re. 27,327
BALANCED BI-DIRECTIONAL NO-BACK MECHANISM
Original Filed Dec. 29, 1966
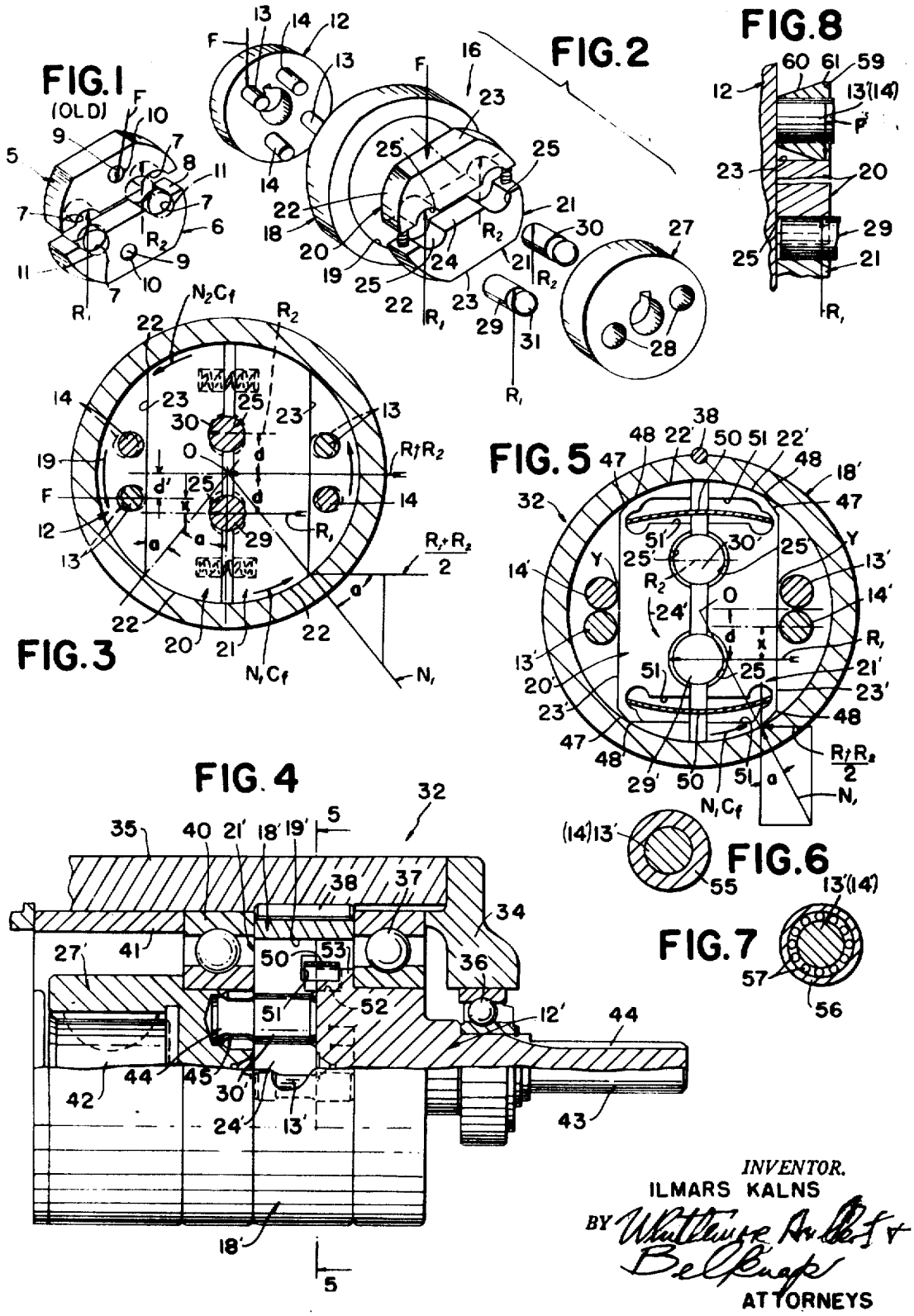
INVENTOR.
ILMARS KALNS
BY Whittemore, Hulbert & Belknap
ATTORNEYS United States Patent Office Re. 27,327
Reissued Apr. 11, 1972

27,327
BALANCED BI-DIRECTIONAL NO-BACK MECHANISM

Ilmars Kalns, Taylor, Mich., assignor to Formsprag Company, Warren, Mich.

Original No. 3,414,095, dated Dec. 3, 1968, Ser. No. 605,872, Dec. 29, 1966. Application for reissue Dec. 2, 1969, Ser. No. 881,400
Int. Cl. F16d *67/00, 51/04*
U.S. Cl. 192—8 3 Claims

Matter enclosed in heavy brackets [ ] appears in the original patent but forms no part of this reissue specification; matter printed in italics indicates the additions made by reissue.

ABSTRACT OF THE DISCLOSURE

A no-back type clutch or anti-feed-back or torque transmitting mechanism is disclosed which has two brake shoes normally urged in a direction to engage a cylindrical brake drum surface, but separated from the latter by the action of driving pins on a power input member. The output member has driven and reaction transmitting pins extending between the brake shoes; and in response to an excessive torque load the output pins spread the shoes into braking engagement with the drum surface, thus limiting the feed back of torque to the input. The output pins react against the shoes on a greater length moment arm than do the input pins, with a resultant couple-balancing effect.

The present invention relates to improvements in a so-called no-back or anti reverse feed-back drive mechanism for connecting a power input source to a driven output line (the mechanism being preferably bi-directional in respect to its rotative force transmission) and acting to prevent back transmission of torque from a driven member to the driver. A similar type of no-back mechanism is the subject matter of my co-pending application, Ser. No. 503,381, filed Oct. 23, 1965, now Letters Patent No. 3,335,831 of Aug. 15, 1967; and one aspect of the invention lies in the fact that the improved mechanism is better balanced than its predecessor in regard to its reception of reactive forces from an opposing driven load and its transference of the reaction to the driver. This permits a more efficient transmission of torque in either rotative direction under a given load condition, and the use of smaller component parts, along with instantaneous backstopping against torque feed-back.

In accordance with the invention the balance is accomplished by transmitting a larger of one of two reactive forces received by a pair of brake shoes from the driven member (as in the case of my earlier application) to the driver on a moment arm of smaller length than that on which that reaction is applied to the shoe. Hence the two reactive force couples, as received by the driver, are equal, or approximately so. This has advantages which are of significance in the design of the mechanism for different load conditions.

What is more, in addition to the advantage of balancing the reaction force couples in the driving phase, it inheres in the improvement of the invention that, when the shoes of the mechanism are subjected to an aiding load (i.e., torque transmitted from the driven through the brake shoes in the same rotative direction as that of the driver), the mechanism possesses a built-in inefficiency as a clutch, the shoes acting against a fixed brake drum under the aiding load condition in the manner of a brake to oppose the aiding load and thereby prevent run-away, just as the shoes brake reverse feed-back in the driving phase against a strongly opposing load.

More specifically, in accordance with the present improvement, input torque from the driver is applied to force-transmitting and anti-reverse braking shoes of the mechanism on a line offset outwardly from the axis of the mechanism, yet radially within a parallel line at which a larger of two reactive forces from the load or driven member is applied to the shoe; and the line on which the reaction is received by the driver coincides with the first named line, but is of course opposite in direction. It follows that the reactive moment arm effective on the driver is less than the moment arm at which the larger reaction is applied to the shoe from the driven side. This equates and balances the force couples fed back to the driver from two parallel reactions of unequal force value, as will appear.

Thus, as in the case of my earlier application, the load reaction is exerted on the shoes through the agency of a pair of pintles projecting parallel to the axis of rotation of the driven member, the pintles being drivingly connected to the latter at point contact ball ends and being received at their other ends between the shoes in arcuate seats of the shoes provided for that purpose. Therefore, it is inherently the case (as in my identified application) that the length of the moment arm of reaction exerted on the shoes by one pintle will exceed that exerted on the shoes by the other pintle, the difference in length equaling the thickness of the shoes, or the distance between opposite axial faces of the latter at which the pins actually transfer the reactive force to the shoes. The real reactive forces in question differ by a multiplication factor represented by the difference in moment arm length in this axial sense.

Thus, when the larger of the two reactive forces is applied to the driver, as at one of two power input pins of the latter, on a lesser moment arm than that at which the larger reaction is applied from the driven member to the shoes, there results the couple-balancing effect, described above, at the driving side, which is beneficial under either an opposing or an aiding load situation. Consequently the driving, as well as the combined reaction transmitting and brake operating, pins and pintles, or equivalent elements, may be made smaller, for any given operating specification, than in the absence of the improvement. A more compact construction on the whole is possible.

In further accordance with the invention, not only does the couple-balancing action take place in relation to a plane transverse of the axis of the drive mechanism, the balance is further improved in relation to a plane paralleling that axis. This is done by applying the input force to the shoe at a point relatively remote, axial-wise, from the driver, i.e., at a point relatively close to the reaction-applying driven member and in approximate alignment with the line of transmission of the greater of the two reactive forces of the driven member.

In another aspect of the invention, the design of the brake shoe is an improved one, as compared to other known no-backs of the shoe and fixed drum type, in that the arcuate surfaces thereof at which they have braking engagement with the drum, are located, and limited considerably as to engaging area, in a zone relatively closely adjacent the mutually facing sides of the shoes. The feature is implied in the patent to Smith No. 2,359,010, of Sept. 26, 1944. However, the resultant improved contact angle, or angle of attack, of the effective radial braking force between the shoes and the drum ties into the idea of a balanced reaction reception as discussed above.

In general, the invention contemplates the provision of an anti-reverse or no-back mechanism or device, in which a relatively fixed brake surface is releasably engageable by a relatively movable brake shoe member, the latter serving as a means of torque transmission from an input or drive member to an output or driven member, in combination with pin, pintle or like elements which are arranged on the respective input and output members in an improved relationship to one another and to the brake shoe, thereby accomplishing the balancing of reactive force couples in the manner described above.

To this end, the power input elements or pins are disposed in a first plane which is spaced radially outwardly of the rotative axis of the input member, and these elements are also in a second plane which intersects said first plane, and also parallels and is spaced outwardly from still another or third plane which includes the rotary axis; and each drive element of the input member of course acts in a circular path predeterminedly spaced outwardly of the rotative axis. On the other hand, an output and reaction transmitting element or pintle of the coaxial power output member, also in spaced relation to the rotative axis, acts on the shoe in opposition to the input member drive element [in a circular path of greater radius than the path described by the input member element or pin. Thus], *but this* reactive force is absorbed and overcome by the last named element on a smaller moment arm than the arm on which the pintle element applies reaction to the shoe, with the resultant balancing effect mentioned above. This is supplemented by the bringing of the input and greater reactive forces applied to the brake shoe practically in direct opposing alignment with one another, in reference to the axial thickness of the shoe.

In further accordance with the invention it is contemplated that, although the pintles which transmit driving force to the driven output member shall have a ball-type, point drive connection to the driven member, the input effort may on the other hand be applied to the force transmitting shoes through the agency of a pair of pin-type drivers in several different ways.

Thus, the input pins may be of solid cylindrical cross-section, as was the case in the single pin drive of my earlier application, or certain advantages may be had by equipping each pin with a rotatable anti-friction sleeve. In the further alternative a roller or ball or needle bearing type anti-friction arrangement may be used.

The foregoing, as well as other objects, will become more apparent as this description proceeds, especially when considered in connection with the accompanying drawings illustrating the invention, wherein:

FIG. 1 is a schematic view in perspective of the brake shoe and pintle arrangement of the mechanism of my above identified prior application, with the ball-headed output pintles shown in dot-dash line in operative driving and reaction transmitting relation to the shoes, this view also indicating by arrows the characteristic unbalanced reaction forces of that arrangement, and also a single pin driving force;

FIG. 2 is an exploded perspective view which, like FIG. 1, is schematic in nature, generally illustrating the improvement of the invention, the views depicting by arrows the nature, direction and places of application of the several input and reactive forces;

FIG. 3 is a view in cross section in a radial plane through the fixed brake drum at 90° to the axis of the latter, and just to one axial side of the shoes of the mechanism of FIG. 2, i.e., with the shoes operatively associated within the drum;

FIG. 4 is a view, partially broken away, in section in a plane including the axis of rotation of the improved balanced mechanism, in a typical fully engineered embodiment thereof;

FIG. 5 is a view in radial section on line 5—5 of FIG. 4, i.e., in a plane normal to the axis of rotation of driver, shoe and driven members;

FIGS. 6 and 7 are views in somewhat enlarged scale in section in radial planes through two types of optional alternative anti-friction drive pin arrangements; and FIG. 8 is a fragmentary view, in vertical cross section on a plane paralleling the axis of the mechanism and, assumedly, through a driver pin and a reaction pintle; illustrating a further improvement by which the power input force is localized substantially in a plane normal to those pins and in alignment, transverse of the brake shoe, with the larger of the two reactive forces, it being understood that this view is a distorted one inasmuch as the input pin and reactive pintle are actually not truly in a common plane.

Reference being first had to FIG. 1 (OLD) schematically showing the basic brake shoe and reaction pin or pintel arrangement of my earlier application, the shoes 5, 6 are each provided with a pair of approximately semi-cylindrical seats 7 in the otherwise flat, mutually facing inner surfaces 8 thereof, these seats being located equidistantly outwardly of the axis of rotation of driver and driven members of the unit of which the shoes are a part. Driving force is transmitted by pins 9 received in cylindrical through openings 10 in the shoes, which pins and openings lie in a plane including the axis of rotation; and a wedge or ramp action described in my earlier application is in effect, although not depicted in FIG. 1.

The ball-headed pintles 11 transmit driving force from the shoes to a driven or output member (not shown), the pintles appearing in dot-dash line in FIG. 1; and it will be noted that unequal forces of reaction $R_1$ and $R_2$ are exerted by pintles 11 on the shoe, the larger force $R_1$ being indicated by the longer solid line or reactive force transmission and the lesser force $R_2$ by the shorter, dotted line.

This arises from the fact that, for a given drive force F exerted by each pin 9 (assuming it to be in the counterclockwise direction of FIG. 1), the force $R_1$ in the reactive, clockwise direction, is exerted upon the brake shoe seat 7 at the axial side of the latter immediately adjacent the output member (not shown but on the near side of the shoe 5, as viewed in FIG. 1), while the lesser force $R_2$ acts on the opposite axial side, remote from the output member, of the brake shoe seat.

*The operation of my prior device, some features of which are shown in FIG. 1, is described in detail in my Letters Patent No. 3,335,831 of Aug. 15, 1967 (reissued on Mar. 11, 1969 as Re. 26,540), which originated in my application, Ser. No. 503,381, filed Oct. 23, 1965. With reference to FIG. 1, assuming that a driver or input member on which the pins 9 are borne is driving in a counterclockwise direction, an instantaneous effect is for each pin 9 to ride up ever so slightly on an arcuate ramp surface afforded by an eccentricity of the pin receiving openings 10 of shoes 5, 6. Accordingly, an inward force as exerted on these effective ramp surfaces has the effect of wedging or camming the shoes 5, 6 radially out of frictional engagement with a fixed cylindrical brake drum surface (not shown) surrounding the shoes. Thus driving force is transmitted from the pins 9 through the shoes 5, 6, as thus freed, and from the shoes through the pintles 11 to the output member on which the pintles are borne.*

*On the other hand, should a predetermined reverse feedback torque arise at said output driven member (not shown), tending to shift the pintles 11 in opposite, purely circumferential directions, the effect of such shift is to tilt each pin about its ball head as a fulcrum. Accordingly, the shoes 5, 6 are instantaneously subjected to force couples causing the shoes to spread into gripping and clamping engagement with the fixed brake surface mentioned above. This grounds out the reverse feed-back torque, but as soon as the undue feed-back effect ceases the drive and brake release pins 9 come into play to debrake the unit and continue the drive.*

Although the mechanism of my earlier application presents substantial advantages of its own over no-backs known at that time, particularly under an aiding load condition, the imbalance of the effective reactive forces $R_1$, $R_2$ is undesirable, being apt to produce reduced drive efficiency and, therefore, the improvements of the invention, as schematically embodied in FIGS. 2 and 3, and in a more fully and sophisticatedly engineered version in FIGS. 4 and 5, make possible the correction of this drawback at the point where the reactive force is received and overcome by the driver, or would ordinarily be received from an aiding load if not braked out.

Thus, in reference to FIGS. 2 and 3, the input or driver member 12 has two pairs of driving pins 13, 14 projecting from an axial face thereof in parallelism with the rotative axis of the mechanism as a whole. This assembly is generally designated by the reference numeral 16. The pins 13, 14 of each pair are equally spaced from one another on opposite sides of a plane including the rotative axis; and the pairs are equally spaced on opposite sides of another plane also including the axis, but at 90° to the first plane. The spacing of the pairs of pins 13, 14, in relation to other shoe seat and driving-reaction pintle components of the mechanism is also of importance in the invention, as will appear.

Mechanism 16 further includes an annular cylindrical brake drum 18 whose internal cylindrical brake surface 19 surrounds and is adapted to be brakingly engaged by a pair of opposed, truncated brake shoes 20, 21. Each of these has quasi-cylindrical surfaces 22 at the radial ends thereof for this purpose, as well as a flat outer and chord-like drive-receiving surface 23 subtending its brake surfaces 22. The surface 24 of each shoe 20, 21 opposite its force-receiving surface 23 is, as in the case of the old mechanism of FIG. 1, provided with approximately semi-cylindrical pintle-receiving seats 25, which extend the entire axial thickness dimension of the shoe and are equi-distantly spaced on opposite sides of the axis of the mechanism 16.

As depicted in FIG. 3, the pairs of drive pins 13, 14 are received within brake drum 18 in axially overlapping relation to, and in a slight spacing outwardly of, the chord surfaces of shoes 20 and 21; and the latter are urged in opposite directions against brake drum surface 19. FIGS. 2 and 3 schematically indicate the spreading force as being applied by coil compression springs 27 on opposite sides of the axis of the mechanism.

Drive pins 13, 14 are of a length approximating the axial length of the chord surfaces 23, against which they exert drive force F in the direction and at the point indicated by arrows in FIGS. 2 and 3. That is, pins 13 so engage in one direction of rotation of drive member 12, for example counter-clockwise as viewed in FIG. 2, and pins 14 so engage in the clockwise direction of drive, after a slight lost motion shift from the solid to the dotted line position of the pins, as indicated in FIG. 3. It may be found desirable to dispose the drive member 12 a trifle within the drum 18, in piloted running clearance relative to the brake surface 19 of the latter, but this is a design consideration having no bearing on the operation of the schematically shown embodiment of FIGS. 2 and 3.

As in my earlier, above-identified application, the output or driven member of mechanism 16, generally designated by the reference numeral 27, has a pair of cylindrical through-openings 28 equally spaced from the rotative axis of the mechanism in a plane including that axis. These openings receive the power output and reaction pintles 29, 30, each of which has an outer ball-shaped end 31. Hence the driving contact of the pintle with the driven member 27 at the holes 28 is in effect a line contact. The remainder of the length of the pintles 29, 30, approximates the axial thickness of the respective brake shoes 22, 23 and the axial length of the seats 25, in which the pintles are nestingly received.

*The no-back clutch assembly 16 of FIGS. 2 and 3 operates in a similar fashion to what is described above in reference to FIG. 1, save for the fact that the driver pin pairs 13 or 14, after traversing the lost motion space between them and a chordal brake shoe surface 23, drivingly engage that surface directly to transmit torque through the latter to an output pintle 29 or 30. Overload feed-back torque is grounded out as described above.*

It may be desirable to slightly flatten seats 25 from a truly cylindrical contour, as indicated in dotted line in FIG. 3, thus permitting a slight degree of side skew to the pintles 29, 30 in the driving phase for a true rotary force-transmitting action. As in the case of drive member 12, driven member 27 may be piloted within fixed brake drum. However, in the production embodiment of FIGS. 4 and 5 this is not done in either case.

*Referring to FIG. 3, it is seen that the distance d separating each of the output and reaction pintles 29, 30 (as located in a plane including a line of reaction force $R_1$ or $R_2$) from a parallel plane (represented by combined reaction force line $R_1+R_2$) including the center of shoes 20, 21 and the axis of rotation of mechanism 16 at 0 slightly exceeds, by the increment x, the distance at which the respective driving or input pins 13, 14 are spaced in the same sense from said plane, i.e. as lying in a plane at $R_1$ or $R_2$ paralleling said axis-including plane at $R_1+R_2$ and including the axis of each pin pair 13, 14. Accordingly, the larger reactive force $R_1$, as transmitted from an output drive pintle 29, is received by an input drive pin 13 at a distance or moment arm d' (FIG. 3), from the rotative axis, in its said paralleling plane, which is less, by the increment of x, than the distance or moment arm at which load reaction force $R_1$ is appplied to the shoe 20; and the result of the difference in value of the forces $R_1$ and $R_2$ is balanced out by the shorter moment arm d', or d minus x, on which the larger is received and overcome by the input member 12. The force couples are equated.*

*Furthermore, any reactive force from the driven end back toward the driver end of the device, regardless of the rotative direction, will cause a tilting of the output pintles 29, 30 in planes including their axes and at 90° to the shoe seats 25, with an effect on both of the brake shoes 20, 21. This is represented, as best shown in FIG. 2, by a larger reactive force $R_1$ acting from pintle 29 on the near edge of the shoe 20, as viewed in FIG. 2, for example on a moment arm (in the direction of the pintle axis) less than the force $R_2$ exerted by the other pintle 30 at the far edge of the shoe 21. Accordingly, the two values of force times moment arm, or the two force couples, as applied to the shoe and as distinguished from the force couples at output and input members referred to in the preceding paragraph, are equalized.*

[Referring to FIG. 3, it is seen that the distance *d* by which each of the output and reaction pintles 29, 30 is spaced radially from the axis of rotation of mechanism 16 at O slightly exceeds, by the increment *x*, the distance at which the respective driving or input pins 13, 14 are spaced radially from that axis. Accordingly, the larger reactive force $R_1$, as transmitted from an output drive pintle 29, is received by an input drive pin 13 at a distance from the rotative axis which is less, by the increment of *x*, than the distance at which load reaction force $R_1$ is applied to shoe 20; and the result of the difference in value of the forces $R_1$ and $R_2$ is balanced out by the shorter moment arm on which the larger is received and overcome by the input member 12. The force couples are equated.]

Again referring to FIG. 3 in reference to the force total reaction force applied equals $R_1+R_2$, one half of the total must be opposed by each of respective shoes 20 and 21, at diagonally opposite brake drum engaging surfaces 22 of the latter, if proper abrupt backstopping is to be had, or by a slightly less force if slip stopping is desired. With this in mind, the invention, as depicted in FIGS. 4 and 5, incorporates a new feature of design of the shoe braking surfaces for the purpose of improving their contact angle or angle of braking attack, as will be later described.

Again referring to FIG. 3 in reerence to the orce vectors and their resultant which are involved in the no-back or backstopping action, it is seen that a reactive force $$\frac{R_1+R_2}{2}$$

must be met at drum and shoe surfaces 19 and 22 by an equal opposing frictional force $N_1C_f$ or $N_2C_f$ (arcuate arrows in FIG. 3) in the circumferential sense, where $C_f$ is the coefficient of friction of the coacting shoe and drum surfaces, $N_1$ and $N_2$ being of course the effective radial braking components at the surfaces.

Accordingly, it is seen that if *a* is the shoe contact angle between a plane through a leading edge of a shoe surface 22 (at which edge force $$\frac{R_1+R_2}{2}$$

is met) and a radial plane intersecting that plane at that edge, the equation holds that $$N_1=N_2=\frac{R_1+R_2}{2\sin\alpha}$$

It is therefore desirable to have the contact angle a as small as possible for the most efficient attack of the effective radial braking forces $N_1$ and $N_2$; and this consideration is carried into effect in the improvement of FIGS. 4 and 5.

Summing force moments about the center O, $$C_1(N_1+N_2)r=SF(R_1-R_2)d$$

where r is the radius of drum surface 19 and SF is the so-called stopping factor of the mechanism, or, in a more practical equation, $$C_1\left(\frac{R_1+R_2}{\sin\alpha}\right)r=SF(R_1-R_2)d$$

it is possible to arrive at the most effective values of shoe contact angle a, drum radius r and reaction moment arm distance d for any contemplated load whether the stopping factor is to be greater than unity for a desired abrupt backstop, or is unity for a desired slip stop.

Now reference should be had to FIGS. 4 and 5, showing a practically engineered version of the improved anti-reverse feed-back device of the invention, designated generally by the reference numeral 32. Although structural details thereof are more refined in nature than those schematically shown in FIGS. 2 and 3, in respects hereinafter described, the basic components of the mechanism 32 are essentially the same in nature and function as those appearing in FIGS. 2 and 3. Accordingly, in the interest of simplicity corresponding components and relationships are designated by corresponding reference numerals, primed, and further description thereof is dispensed with. As for significant dimensions, force vectors and the like, the same designations appear in FIG. 5 as in FIGS. 2 and 3.

The input or drive member 12' of device 32 is journaled in an end wall 34 of a housing, which also incorporates a cylindrical casing wall 35, as by means of a ball bearing 36; and member 12' is further rotatively journaled within casing 35 by a larger diameter ball bearing 37, the outer race of which is suitably restrained against rotation. Brake drum 18' is similarly held from rotation by means of a pin 38; and the output or driven member 27' is rotatively journaled within casing 35 by a third ball bearing 40, which is suitably restrained against rotation at its outer race. A retaining ring 41 telescoped within casing 35 engages said outer bearing race to prevent axial shift of the assembly relative to drum 18'.

Driven or output member 27' *has a tubular portion which* internally receives and is keyed to an output [sleeve] *shaft* 42; and driver or input member 12' has a reduced external extension 43 provided with a keyway 44 for the drive of device 32 from an appropriate power source.

As illustrated in FIG. 5, the power input pins 13', 14' are in a considerably more close relation to one another than in the theoretical version of FIGS. 2 and 3, thus substantially increasing the moment or lever arm distance factor *x* which is enjoyed by the pins 13' or 14' in receiving the larger value reaction force $R_1$, i.e., the lessened moment arm at which the reactive force is applied to a pin, as compared with the moment arm at which said reactive force is applied to a brake shoe 20' of 21'.

As appears in FIG. 4, the drive and reaction receiving and transmitting pintles 29', 30' of the device 32 are equipped with special, quasi-ball shaped heads 44, which have a universal action in seats 45 of output or driven member 27', thus permitting a desired swivel sort of force transmission to the output member, and corresponding reception of the reactive force, of course.

As in the embodiment of FIGS. 2 and 3, the seats 25' in which the cylindrical portions of pintles 30' are received are equi-distant on opposite sides from a central plane radial of and including the axis at O of mechanism 32' and the same is true of the power input pintles 13', 14' of each pair. Likewise, the pairs 13', 14' are spaced slightly outwardly at y from the respective chord surfaces 23' of brake shoes 20' and 21', at which drive is imparted to the shoes.

It is to be noted with reference to FIG. 5, that each shoe is relieved somewhat at 47 just outwardly of, or on the leading side of its surface 22' at which it frictionally engages the drum surface 19' of brake drum 18'. Thus, although the total effective braking surface between shoes and drum is diminished, the contact angle a is also diminished, with the result that the real effective radial braking component $N_1$ (or $N_2$) is increased, thus better to amplify the reactive force component $$\frac{R_1+R_2}{2}$$

which is received at the leading edge, designated 48 in FIG. 5, of the shoe.

A further special improvement in the embodiment 32 of FIGS. 4 and 5 is the provision of bowed leaf-type springs 50, which are received in recesses 51 in the inner faces 24' of shoes 21'. These springs, as shown in FIG. 4 extend axially outwardly of said faces 24' and overlap into radially opening recesses 52 in an enlarged annular flange 53 of driver or power input member 12', just to the left (FIG. 4) of the inner race of ball bearing 37. Springs 50 will be energized upon a relative rotative action of both of shoes and the driver in either direction. It follows that, as coactively engaged with the acting between the shoes 20', 21' and driver member 12', the leaf springs 50 automatically return the input to a neutral position upon the cessation of drive, or an aiding load, spaced by y, of their force-receiving chord surfaces 23' (FIG. 5) from the drive pin pairs 13', 14. The device 32 is thus conditioned for instantaneous resumption of drive, without an intervening recovery time, however, brief it may be.

*The operation of the clutch embodiment 32 of FIGS. 4 and 5 is similar to the operation described above with reference to FIGS. 1, 2 and 3; assuming that drive pins 13, 13' are driving in a counterclockwise direction, they engage shoe surfaces 23' after a slight increment of lost motion to separate shoe surfaces 22' from frictional engagement with the fixed cylindrical brake drum surface, upon which driving force is transmitted from the pins 13' through the shoes 20', 21' and from the shoes through the pintles 29', 30' to the output member 27'.*

*Should an excess reverse feed-back torque arise at said output member tending to shift the pintles in opposite directions, the effect is to tilt each pintle about its ball head as a fulcrum. The shoes are instantaneously subjected to*

*force couples causing them to spread and ground out the feed-back torque on the fixed brake drum surface until the undue feed-back effect ceases.*

As indicated in the above discussion, an appropriate design of device 32, as to drum radius r, brake contact angle a, reaction moment arm distance d, etc., may be arrived at for any given load or load condition by resort to the equations set forth above.

Although the mechanism 32 operates well and effectively using simply the pairs of pins 13', 14', it is contemplated that the latter may, if desired, be equipped with some appropriate anti-friction provision, suggested forms of which are shown in FIGS. 6 and 7 in somewhat enlarged scale.

Thus, FIG. 6 has the pin 13' or 14' fitted with a simple anti-friction sleeve or race 55 having reasonably close running clearance relative thereto; while the embodiment of FIG. 7 employs a ball, roller or needle bearing arrangement. This is typically comprised of an outer bearing sleeve or race 56, with appropriately spaced ball, roller or needle-type bearing elements 57 interposed between this sleeve and a pin 13' or 14'. If it is seen fit to employ anti-friction means of the type illustrated in FIGS. 6 and 7, the sleeve or solid roller version 55 of FIG. 6 may well be preferred, for the reason that a slight internal frictional wear of the latter after a period of service (ordinarily thought to be objectionable) will permit bearing sleeve 55 to fall back a trifle. Hence, notwithstanding inevitable wear of the shoe braking surface 22', the slight spacing at y of drive pin pairs 13', 14' from shoe surfaces 23' in the neutral condition will be maintained. It is evident that this will not be the case in the version depicted in FIG. 6, in which wear is non-existent for all practical purposes.

FIG. 8 of the drawings illustrates a further improvement which may be incorporated as a part of the invention, and which permits the driving or input force F to be applied to a shoe 20 or 21 in a more effective way to improve the balance of input and the larger force R, of the two reactions. This is done by bringing the actual point of application of the force F to the shoe axially outward and substantially in the transverse plane adjacent the driver in which the greater reactive force R, acts on the seat 25 of the brake shoe. FIG. 8 shows this improvement as being incorporated in the basic assembly of FIGS. 2 and 3; however, it is of course capable of being carried out in the more refined unit of FIGS. 4 and 5. Moreover, the balancing, axial-wise, of the input force and greater reactive force may be accomplished structurally in various simple ways; FIG. 8 shows it being done by a slight modification of the anti-friction pin and sleeve arrangement of FIG. 6. Thus, the input pins 13', 14' are shown as being equipped with special anti-friction rollers or sleeves 59 which are circumferentially tapered at 60 and of a frustoconical outline in axial cross section. Accordingly, as applied to pin 13' or 14' in the manner of FIG. 8, the application of input driving force F is brought out to a point relatively remote from the driver 12, being applied at the annular shoulder 61 of roller 59. It is therefore substantially in a plane transverse of the axes of the input pins 13' or 14' and the reactive pintles 29, 30. Pin 13' therefore more effectively receives and overcomes the larger force R, of the two reactive efforts.

It desired, the pintle-receiving seats 25' of shoes 20', 21' may be flattened a trifle, i.e., not precisely semi-circular, in order to permit a slight lateral skew of the pins in action for a uniformly true line of force transmission to output member 27', as was described above in reference to FIG. 3.

The embodiment of FIGS. 4 and 5 possesses all the novel and valuable attributes of balanced reaction, improved shoe contact angle and the like, previously described, making for a smaller size and more compact mechanism for any given load, than has heretofore been possible in generally similar brake type anti-reverse devices of which I am aware.

In this connection the patent to Smith identified above relates to a drum and shoe kind of no-back device, in which a relieving of the shoe braking surfaces is suggested, generally comparable to the shoe relief illustrated at 47 in FIG. 5. However, the improvement in respect to making possible a choice of a desirable contact angle a, in relation to other design considerations of the device, is to my knowledge, unique in the art, particularly as coupled with the improved provisions for balancing reactive force couples, and particularly with attendant improved disciplining of forces transmitted in one way or another through the shoes, all resulting in a significant diminution of size of force-transmitting components and compacting of the mechanism as a whole.

What is claimed is:

[1. A feed-back torque limiting device, comprising means providing a brake surface, a rotary power input member having a drive element following a circular path predeterminedly spaced radially outwardly of the rotative axis of said member in a driving phase of the device, a brake shoe having a surface releasably engageable in braking relation to said first named brake surface, said shoe being drivingly engaged by said element in said driving phase, and a rotary power output member coaxial with said input member and having an output and reaction transmitting element also in radially outwardly spaced relation to said rotative axis, said last named element reacting on said shoe in opposition to said drive element and in a circular path of greater radius than said first path whereby said drive element of said input member receives reaction from said brake shoe on a moment arm smaller than that on which the reaction is applied to the shoe by said output and reaction transmitting element, said last named element actuating said brake surfaces for braking engagement with one another in a phase of operation of the device in which there is excessive feed-back torque from said output member.]

[2. The device of claim 1, in which said power input member has a pair of said drive elements and said power output member has a pair of said output and reaction transmitting elements, the elements of the respective pairs being equi-distantly spaced respectively from each other on opposite sides of a plane including said rotative axis.]

[3. The device of claim 2, in which there is a further brake shoe similar to and diametrally spaced from said first named shoe, which further shoe is also releasably engageable at its brake surface with the first named brake surface, said shoes having mutually facing surfaces between which the elements of said power output member are received to transmit force between said shoes, said pair of said output member having relations to said further shoe and said rotative axis similar to that of said first named pairs of elements.]

[4. The device of claim 3, in which said input member has pairs of power input elements spaced outward in a neutral condition of the device from portions of the respective brake shoes drivingly engaged by said input elements.]

[5. The device of claim 4, and further comprising spring means acting between one of said input and output members and at least one of said shoes to return to and to so space said drive elements, in said neutral condition.]

[6. The device of claim 5, in which said spring means comprises at least one leaf-type spring axially spanning between at least one of said shoes on the one hand and one of said power input and output members on the other, said spring means being energized in the driving phase.]

[7. The device of claim 1, in which said drive element comprises a pin extending parallel to said rotative axis and directly engaging said shoe to drive the latter.]

[8. The device of claim 2, in which each of said drive elements comprises a pin extending parallel to said rotative axis.]

[9. The device of claim 8, in which each of said drive pins has anti-friction means drivingly engaging the same with the shoes.]

[10. The device of claim 1, in which said drive element transmits input effort to said brake shoe substantially in a plane normal to said axis and at least approximately including the line of action of said output and reaction transmitting element on said shoe.]

[11. The device of claim 2, in which said drive elements transmit input effort to said brake shoe substantially in a plane normal to said axis and at least approximately including the lines of action of said output and reaction transmitting elements on said shoe.]

[12. The device of claim 3, in which said drive elements transmit input effort to said brake shoe substantially in a plane normal to said axis and at least approximately including the lines of action of said output and reaction transmitting elements on said shoes.]

[13. The device of claim 12, in which said pairs of drive elements are spaced outwardly in a neutral condition of the device from portions of the respective brake shoes drivingly engageable by said drive elements, and further comprising spring means acting between one of said input and output members and at least one of said shoes to return to and to so space said drive elements in said neutral condition.]

[14. The device of claim 13, in which said spring means comprises at least one leaf-type spring axially spanning between at least one of said shoes on the one hand and one of said power input and output members on the other, said spring means being energized in the driving phase.]

*15. A feed-back torque limiting device, comprising means providing a brake surface, a rotary power input member having pairs of drive elements each following a circular path predeterminedly spaced radially outwardly of the rotative axis of said member in a driving phase of the device, a pair of diametrally spaced brake shoes each having a pair of spaced surfaces releasably engageable in braking relation to said first named brake surface, said shoes being drivingly engaged respectively by said pairs of elements in said driving phase, and a rotary power output member coaxial with said input member and having a pair of output and reaction transmitting elements also in radially outwardly spaced relation to said rotative axis, the elements of the respective input and output member pairs being equi-distantly spaced respectively from each other on opposite sides of a plane including said rotative axis and extending centrally between said surfaces of the respective shoes, said shoes having mutually facing surfaces between which the elements of said power output member are received to transmit force between said shoes, corresponding input and output member elements of said pairs being offset on the same side of said axis-including plane, said output member elements being farther from said plane than said input member elements and reacting on said shoes in opposition to said drive elements in circular paths of such radius relative to said first named circular path that said elements of said input member receive reaction from said brake shoes on a moment arm smaller than that on which the reaction is applied to the shoe by said output and reaction transmitting elements, said last named elements actuating said brake surfaces of said shoes for braking engagement with said first named brake surface in a phase of operation of the device in which there is excessive feed-back torque from said output member, said input member drive element pairs being spaced outwardly in a neutral condition of the device from portions of the respective brake shoes drivingly engaged by said input elements.*

*16. The device of claim 15, and further comprising spring means acting between one of said input and output members and at least one of said shoes to return to and to so space said drive elements in said neutral condition.*

*17. The device of claim 16, in which said spring means comprises at least one leaf-type spring axially spanning between at least one of said shoes on the one hand and one of said power input and output members on the other, said spring means being energized in the driving phase.*

References Cited

The following references, cited by the Examiner, are of record in the patented file of said patent or the original patent.

UNITED STATES PATENTS

| | | | |
|---|---|---|---|
| 1,617,745 | 2/1927 | Cousinard | 192—8 |
| 2,031,186 | 2/1936 | Still | 192—8 X |
| 2,359,010 | 9/1944 | Smith | 192—8 |
| 2,995,226 | 8/1961 | Gilder | 192—8 |
| 3,051,282 | 8/1962 | Greene | 192—8 |
| 3,250,352 | 5/1966 | Morgan | 192—8 |
| 3,335,831 | 8/1967 | Kalns | 192—8 |
| 3,497,044 | 2/1970 | Kalns | 192—8 |
| 2,347,293 | 4/1944 | Smith | 192—8 |
| 2,359,011 | 9/1944 | Smith | 192—8 X |

BENJAMIN W. WYCHE, Primary Examiner

U.S. Cl. X.R.

188—134